United States Patent
Ma et al.

(10) Patent No.: US 12,071,560 B2
(45) Date of Patent: Aug. 27, 2024

(54) COATING COMPOSITION FOR POUROUS CONSTRUCTION MATERIALS

(71) Applicants: Dow Global Technologies LLC, Midland, MI (US); Dow Silicones Corporation, Auburn, MI (US)

(72) Inventors: Beatriz C. Ma, Schierstein (DE); Jean-Paul Lecomte, Seneffe (BE); Jouko Vyoerykkae, Horgen (CH); Sabrina Salvati, Seneffe (BE)

(73) Assignees: Dow Global Technologies LLC, Midland, MI (US); Dow Silicones Corporation, Auburn, MI (US)

( * ) Notice: Subject to any disclaimer, the term of this patent is extended or adjusted under 35 U.S.C. 154(b) by 653 days.

(21) Appl. No.: 17/280,006

(22) PCT Filed: Sep. 23, 2019

(86) PCT No.: PCT/US2019/052408
§ 371 (c)(1),
(2) Date: Mar. 25, 2021

(87) PCT Pub. No.: WO2020/068655
PCT Pub. Date: Apr. 2, 2020

(65) Prior Publication Data
US 2021/0395557 A1    Dec. 23, 2021

Related U.S. Application Data

(60) Provisional application No. 62/890,350, filed on Aug. 22, 2019, provisional application No. 62/737,577, filed on Sep. 27, 2018.

(51) Int. Cl.
| | | |
|---|---|---|
| *C09D 133/08* | (2006.01) | |
| *C09D 7/20* | (2018.01) | |
| *C09D 7/63* | (2018.01) | |
| *C09D 133/12* | (2006.01) | |
| *C08K 5/5415* | (2006.01) | |

(52) U.S. Cl.
CPC ............. *C09D 133/08* (2013.01); *C09D 7/20* (2018.01); *C09D 7/63* (2018.01); *C09D 133/12* (2013.01); *C08K 5/5415* (2013.01)

(58) Field of Classification Search
USPC .......................................... 524/832; 523/179
See application file for complete search history.

(56) References Cited

U.S. PATENT DOCUMENTS

| | | |
|---|---|---|
| 9,175,187 B2 | 11/2015 | Killilea et al. |
| 10,035,923 B2 | 7/2018 | Betremieux et al. |
| 10,465,079 B2 | 11/2019 | Bai et al. |
| 2007/0292623 A1 | 12/2007 | Lin et al. |
| 2014/0303318 A1 | 10/2014 | Killilea et al. |
| 2016/0002473 A1* | 1/2016 | Yildirim .......... C09D 123/0853 427/136 |
| 2016/0244629 A1 | 8/2016 | Xu et al. |

FOREIGN PATENT DOCUMENTS

| | | |
|---|---|---|
| CN | 1931917 A | 3/2007 |
| CN | 101104763 A | 1/2008 |
| CN | 101362815 A | 2/2009 |
| JP | H05-287234 | 11/1993 |
| JP | H06-256072 | 9/1994 |
| JP | H10-236889 | 9/1998 |
| JP | 2000319549 | 11/2000 |
| WO | 0044836 A1 | 8/2000 |
| WO | 2017175903 A1 | 10/2017 |

OTHER PUBLICATIONS

International Preliminary Report on Patentability for related PCT Application PCT/US2019/052408, mailed Apr. 8, 2021 (8 pgs).
International Preliminary Report on Patentability for related PCT Application PCT/US2019/052399, mailed Apr. 8, 2021 (8 pgs).
International Search Report & Written Opinion for related PCT Application PCT/US2019/052408, mailed Dec. 11, 2019 (13 pgs).
International Search Report & Written Opinion for related PCT Application PCT/US2019/052399, mailed Dec. 11, 2019 (13 pgs).

* cited by examiner

*Primary Examiner* — Fred M Teskin
(74) *Attorney, Agent, or Firm* — Brooks, Cameron & Huebsch, PLLC

(57) ABSTRACT

The present disclosure provides for an aqueous coating composition to coat and form a film on porous construction materials to help in controlling efflorescence in the porous construction materials. The aqueous coating composition includes a binder having an acrylic polymer in an acrylic polymer waterborne dispersion, wherein the acrylic polymer has a glass transition temperature (Tg) of 1° C. to 60° C.; and an alkoxy silane coalescing agent in a waterborne silane coalescing emulsion. The aqueous coating composition optionally further includes an additive selected from the group consisting of a pigment, a filler and combinations thereof. In one embodiment, the alkoxy silane coalescing agent provides the only coalescing agent for the acrylic polymer waterborne dispersion in the aqueous coating composition.

20 Claims, 2 Drawing Sheets

COATING COMPOSITION FOR POUROUS CONSTRUCTION MATERIALS

This application is a National Stage Application under 35 U.S.C. § 371 of International Application Number PCT/US2019/052408, filed Sep. 23, 2019 and published as WO 2020/068655 on Apr. 2, 2020, which claims the benefit to U.S. Provisional Application 62/890,350, filed Aug. 22, 2019 and U.S. Provisional Application 62/737,577, filed Sep. 27, 2018, the entire contents of which are incorporated herein by reference in its entirety.

FIELD OF DISCLOSURE

The present disclosure relates generally to coating compositions and more specifically to coating compositions for use with porous construction materials.

BACKGROUND

There is a need to protect porous construction materials, like cement-based construction materials, against water infiltration in order to prevent issues like corrosion of steel reinforcement bars, efflorescence and structural damages due to freeze-thaw cycles. Efflorescence is a phenomenon describing the migration and precipitation of salts to the surface of porous construction materials, like concrete, where the salts form blotchy, powdery and/or crystalline deposits. Efflorescence occurs when absorbed moisture dissolves the salts in the porous construction material. The salts then migrate to the surface of the porous construction material. Once at the surface, the water evaporates leaving the salts as a white coating on the surface of the porous construction material.

It is known that efflorescence can be reduced by reducing water movement in the porous construction material. Often this can be done by coating or by impregnation with silicon-based materials. Silicone based impregnation provide a protection against water penetration which is invisible and leave the surface of the porous construction material with an un-modified look. However, it has been observed that silicone-based impregnation solutions are sometimes not efficient to protect against efflorescence.

So, there is a need to protect porous construction materials to provide protection not only against water ingress which can lead to freeze thaw damages, swelling, corrosion, warping or weakening of mechanical properties (such as observed for fiber cement boards), but also against efflorescence which can be observed, despite efficient reduction of water penetration following treatment of the surface with silicone based water repellent.

Another approach is to use acrylic based protection in attempting to reduce water penetration in the porous construction material. Acrylic based protection is based on the formation of a film at the surface of the porous construction material and leads to some surface appearance modification. Even if no pigments/filler are added in the acrylic, the surface of the porous construction materials will have a clear visual gloss. For some applications, there is a need to provide protection for porous construction materials which leave the appearance of the material un-modified (i.e., to have a "natural look") and with no visual gloss.

Many acrylic based protection compositions also require the use of a coalescing agent to aid film formation. The coalescing agents often consist of solvents based on alcohols, esters, ketones and glycol ethers. However, there is a tendency towards reducing the use of organic solvents as coalescing agent in coating compositions due to environmental concerns.

Therefore, there is a need in the art for the development of a new coalescing agent for use with acrylic based protection compositions that provide desirable properties like assisting acrylic latex film formation, compatibility and providing water repellent properties to films formed on porous construction materials such as fiber cement roofs/façades and concrete roof tiles.

SUMMARY

The present disclosure provides an aqueous coating composition to coat and subsequently form a film on porous construction materials, where the film helps in controlling efflorescence in the porous construction materials. The aqueous coating composition of the present disclosure provides a new coalescing agent for use with acrylic based protection compositions that provide desirable properties like assisting acrylic latex film formation, compatibility and providing water repellent properties to films formed on porous construction materials such as fiber cement roofs/façades and concrete roof tiles.

As provided herein, the aqueous coating composition of the present disclosure includes a mixture of an alkoxy silane coalescing agent in a waterborne silane coalescing emulsion and an acrylic polymer in an acrylic polymer waterborne dispersion that when formed into a film work synergistically to provide better protection to porous construction materials against water infiltration in comparison to the use of the standard coalescing agents such as ethylene glycol monobutyl ether. While not wishing to be bound by theory, it is believed that the alkoxy silane coalescing agent in the waterborne silane coalescing emulsion acts as a coalescing agent during the acrylic polymer film formation process to effectively lower the minimum film formation temperature and assist the film formation of the acrylic polymer in an acrylic polymer waterborne dispersion at room temperature with a mechanism similar to standard coalescing agent ethylene glycol monobutyl ether.

For the various embodiments, the aqueous coating composition includes a binder having the acrylic polymer in the acrylic polymer waterborne dispersion, where the acrylic polymer has a glass transition temperature (Tg) of 1° C. to 60° C., and the alkoxy silane coalescing agent in the waterborne silane coalescing emulsion. The aqueous coating composition optionally further includes an additive selected from the group consisting of a pigment, a filler and combinations thereof. For the present disclosure, it is possible for the alkoxy silane coalescing agent to provide the only coalescing agent for the acrylic polymer waterborne dispersion in the aqueous coating composition.

For the various embodiments, the aqueous coating composition of the present disclosure includes 3.5 to 100 weight percent (wt. %) of the binder and 96.5 to 0 wt. % of the additive selected from the group consisting of a pigment, a filler and combinations thereof. The wt. % of the binder and the additive are based on the total dry weight of the aqueous coating composition. The binder comprises by dry weight based on the total dry weight of the binder 85 wt. % to 97 wt. % of the acrylic polymer in the acrylic polymer waterborne dispersion, where the acrylic polymer has a glass transition temperature (Tg) of 1° C. to 60° C., and 15 wt. % to 3 wt. % of the alkoxy silane coalescing agent in the waterborne silane coalescing emulsion. For the various embodiments, it is possible for the alkoxy silane coalescing agent to provide the only coalescing agent for the acrylic polymer waterborne dispersion in the aqueous coating composition. Preferably, the acrylic polymer in the acrylic polymer waterborne dispersion has a Tg of 25° C. to 55° C. In a specific embodiment, 100 wt. % of the binder forms the aqueous coating composition, the wt. % based on the total dry weight of the aqueous coating composition.

The acrylic polymer waterborne dispersion for the various embodiments can also have an acid level of up to 2 percent by weight of acid monomers based on a dry weight of the acrylic polymer. For the various embodiments, the acrylic polymer of the acrylic polymer waterborne dispersion is formed with non-ionic monomers selected from the group consisting of methyl methacrylate, methyl acrylate, ethyl acrylate, butyl acrylate, styrene, butyl methacrylate, 2-ethylhexyl acrylate, t-butyl acrylate, α-methyl styrene, vinyl acetate, hexyl acrylate and combinations thereof. More specifically, for the various embodiments the acrylic polymer of the acrylic polymer waterborne dispersion is formed with non-ionic monomers selected from the group consisting of methyl methacrylate and butyl acrylate. In additional embodiments, the acrylic polymer of the acrylic polymer waterborne dispersion is formed with non-ionic monomers selected from the group consisting of methyl methacrylate and 2-ethylhexyl acrylate.

For the various embodiments, the alkoxy silane coalescing agent is selected from the group consisting of $R^1Si(OR)_3$, $(R^1)_2Si(OR)_2$ and combinations thereof, where each IV is independently selected from an alkyl group having 1 to 20 carbon atoms, a substituted alkyl group having 1 to 20 carbon atoms, an aryl group having 6 to 20 carbon atoms or a substituted aryl group having 6 to 20 carbon atoms, and where each R is independently selected from an alkyl group having 1 to 6 carbon atoms. More specifically, for the various embodiments the alkoxy silane coalescing agent is $R^1Si(OR)_3$. When the alkoxy silane coalescing agent is $R^1Si(OR)_3$, for the various embodiments, IV has 8 carbon atoms and R has 2 carbon atoms to provide triethoxy(octyl)silane. Alternatively, IV has 6 carbon atoms and R has 2 carbon atoms to provide triethoxy(hexyl)silane.

For the various embodiments, the aqueous coating composition as provided herein can have water in an amount sufficient to provide the aqueous coating composition with a solids content of 2 to 70 wt. % based on the total weight of the aqueous coating composition. The aqueous coating composition of the present disclosure can be used to form a film on a porous construction material. Specifically, the present disclosure includes a porous construction material at least partially coated with a film formed with the aqueous coating composition as provided herein. Examples of the porous construction material include an inorganic porous construction material. Additional examples of the porous construction material include an organic porous construction material.

DETAILED DESCRIPTION

Figures 1A, 1B, 1C, 1D, 1E, 1F, 1G, 1H:
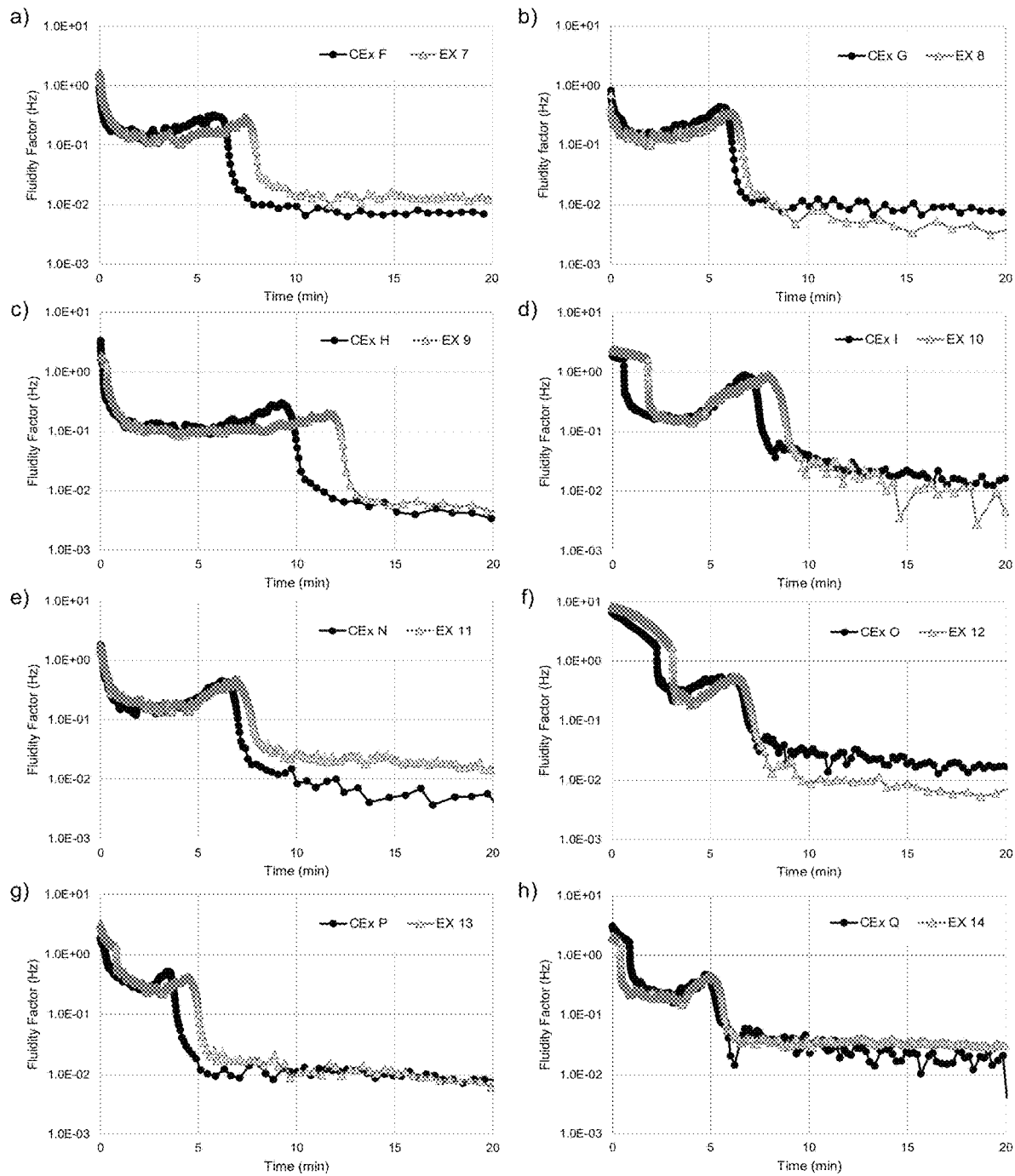
FIGS. 1A-1H provide film formation speckle rate kinetics plots of aqueous coating compositions for Comparative Examples and Examples of the of the present disclosure.

The present disclosure provides an aqueous coating composition to coat and subsequently form a film on porous construction materials, where the film helps in controlling efflorescence in the porous construction materials. The aqueous coating composition of the present disclosure provides a new coalescing agent for use with acrylic based protection compositions that provide desirable properties like assisting acrylic latex film formation, compatibility and providing water repellent properties to films formed on porous construction materials such as fiber cement roofs/façades and concrete roof tiles.

As provided herein, the aqueous coating composition of the present disclosure includes a mixture of an alkoxy silane coalescing agent in a waterborne silane coalescing emulsion and an acrylic polymer in an acrylic polymer waterborne dispersion that when formed into a film works synergistically to provide better protection to porous construction materials against water infiltration in comparison to the use of the standard coalescing agent ethylene glycol monobutyl ether. While not wishing to be bound by theory, it is believed that the alkoxy silane coalescing agent in the waterborne silane coalescing emulsion acts as a coalescing agent by effectively lowering the minimum film formation temperature and assisting the film formation of the acrylic polymer in an acrylic polymer waterborne dispersion at room temperature with a mechanism similar to standard coalescing agent ethylene glycol monobutyl ether.

For the various embodiments, apart from the alkoxy silane coalescing agent, the aqueous coating composition of the present disclosure does not include another coalescing agent. In other words, the alkoxy silane coalescing agent provides the only coalescing agent for the acrylic polymer waterborne dispersion in the aqueous coating composition of the present disclosure. Alternatively, for the various embodiments one or more additional coalescing agents as are known in the art can be used with the alkoxy silane coalescing agent of the aqueous coating composition, as provided herein, for the acrylic polymer waterborne dispersion in the aqueous coating composition of the present disclosure. As is typical in the art, coalescing agents are used to assist in the formation of films in film-forming compositions. Coalescing agents assist in film formation by, among other things, reducing the minimum film-forming temperature (MFFT) of polymer(s) dispersed in the composition. Reducing the MFFT of the polymer(s) helps them to better coalesce, where the coalescing agent functions as a temporary plasticizer for the polymer(s). So, coalescing agents help with film formation at temperatures that are below the MFFT of the polymer(s) present in the composition. Examples of known coalescing agents include glycol ethers such as propylene glycol alkyl ethers and dipropylene glycol alkyl ethers, which include DOWANOL™ PnP, DOWANOL PnB, and DOWANOL DPnB, ethylene glycol monobutyl ether such as Butyl CELLOSOLVE™ Solvent and Texanol™ ester alcohol.

Surprisingly, the use of the alkoxy silane coalescing agent as provided in the present disclosure has not been recognized nor used as a coalescing agent in coating compositions for use in controlling efflorescence in porous construction materials. In addition, the use of the waterborne silane coalescing emulsion in providing the alkoxy silane coalescing agent as provided in the present disclosure demonstrates low volatility and includes no additional volatile organic compounds (VOC), features which are both highly beneficial for the environment. As such, it is possible for the aqueous coating composition of the present disclosure not to include any additional coalescing agent(s) besides the alkoxy silane coalescing agent as provided in the present disclosure as they are not needed.

Aqueous Coating Composition

For the various embodiments, the aqueous coating composition includes a binder having an acrylic polymer in an acrylic polymer waterborne dispersion, where the acrylic polymer has a glass transition temperature (Tg) of 1° C. to 60° C., and an alkoxy silane coalescing agent in a waterborne silane coalescing emulsion. The aqueous coating composition can optionally further includes an additive selected from the group consisting of a pigment, a filler and combinations thereof. For the various embodiments, the aqueous coating composition of the present disclosure includes 3.5 to 100 weight percent (wt. %) of the binder and 96.5 to 0 wt. % of the additive selected from the group consisting of a pigment, a filler and combinations thereof. The wt. % of the binder and the additive are based on the total dry weight of the aqueous coating composition.

For clarity, when the ingredients of the aqueous coating composition are described as being present in a weight percent, it is understood that the basis of the weight percent is the dry weight of the aqueous coating composition and that the dry weight of all ingredients, including any optional additives, will sum up to 100 weight percent. For example, the wt. % of the binder and the additive are based on the total dry weight of the aqueous coating composition and will total to 100 wt. % without taking the aqueous phase used in the aqueous coating composition into account. Accordingly, when the binder is 90 wt. %, for example, the additive is 10 wt. % of the aqueous coating composition to arrive at 100 wt. % (on a dry basis) of the aqueous coating composition.

All individual values and subranges from 3.5 to 100 wt. % of the binder and 96.5 to 0 wt. % of the additive are included and disclosed herein. For example, the aqueous coating composition can include from a lower value of 3.5, 4, 5, 6, 7, 10, 15, 20, 25 or 30 wt. % to an upper value of 50, 55, 60, 65, 70, 75, 80, 85, 90, 95, 99 or 100 wt. % of the binder, while the additive can include from a lower value of 0, 1, 5, 10, 15, 20, 25, 30, 35, 40, 45 or 50 wt. % to an upper value of 70, 75, 80, 85, 90, 92, 94 or 96.5 wt. % of the additive. Preferably, the range includes 3.5 to 85 wt. % of the binder and 0.1 to 15 wt. % of the additive. More preferably, the range includes 3.5 to 70 wt. % of the binder and 0.15 to 15 wt. % of the additive. Most preferably, the range includes 3.5 to 60 wt. % of the binder and 0.2 to 10 wt. % of the additive. In a specific embodiment, 100 wt. % of the binder forms the aqueous coating composition, the wt. % based on the total dry weight of the aqueous coating composition.

Binder

The binder of the present disclosure comprises by dry weight based on the total dry weight of the binder 85 wt. % to 97 wt. % of an acrylic polymer in an acrylic polymer waterborne dispersion, where the acrylic polymer has a glass transition temperature (Tg) of 1° C. to 60° C., and 15 wt. % to 3 wt. % of an alkoxy silane coalescing agent in a waterborne silane coalescing emulsion. When the ingredients of the binder of the aqueous coating composition are described as being present in a weight percent, it is understood that the basis of the weight percent is the dry weight of the binder and that the dry weight of all ingredients will sum up to 100 weight percent. The wt. % of the acrylic polymer and the alkoxy silane coalescing agent in the binder are based on the total dry weight of the binder and will total to 100 wt. % without taking the aqueous phase used in either the acrylic polymer waterborne dispersion or the waterborne silane coalescing emulsion into account. Accordingly, when the acrylic polymer in the acrylic polymer waterborne dispersion is 85 wt. %, for example, the alkoxy silane coalescing agent in the waterborne silane coalescing emulsion will be 15 wt. % to arrive at 100 wt. % (on a dry basis) of the binder.

All individual values and subranges from 85 wt. % to 97 wt. % of the acrylic polymer in the acrylic polymer waterborne dispersion and 15 wt. % to 3 wt. % of the alkoxy silane coalescing agent in the waterborne silane coalescing emulsion are included and disclosed herein. For example, the binder can include from a lower value of 85, 86, 88, 90 wt. % to an upper value of 92, 94, 95 or 97 wt. % of the acrylic polymer in the acrylic polymer waterborne dispersion, while the alkoxy silane coalescing agent in the waterborne silane coalescing emulsion can include a lower value of 3, 5, 6 or 8 wt. % to an upper value of 10, 12, 14 or 15 wt. % of the alkoxy silane coalescing agent in the waterborne silane coalescing emulsion. Preferably, the range includes 97 to 85 wt. % of the acrylic polymer and 3 to 15 wt. % of the alkoxy silane coalescing agent. More preferably, the range includes 96.5 to 88 wt. % of the acrylic polymer and 3.5 to 12 wt. % of the alkoxy silane coalescing agent. Most preferably, the range includes 95 to 90 wt. % of the acrylic polymer and 5 to 10 wt. % of the alkoxy silane coalescing agent.

Acrylic Polymer

As used herein, the acrylic polymer waterborne dispersion refers to a mixture of the acrylic polymer in an aqueous based continuous phase. As used herein acrylic polymer waterborne dispersion refers to a water based emulsion, where the acrylic polymer of the acrylic polymer waterborne dispersion is formed with non-ionic monomers selected from the group consisting of methyl methacrylate, methyl acrylate, ethyl acrylate, butyl acrylate, styrene, butyl methacrylate, 2-ethylhexyl acrylate, t-butyl acrylate, α-methyl styrene, vinyl acetate, hexyl acrylate and combinations thereof. The use of the term "meth" followed by another term such as methacrylate refers to both acrylates and methacrylates. Preferably, the acrylic polymer of the acrylic polymer waterborne dispersion is formed with non-ionic monomers selected from the group consisting of methyl methacrylate and butyl acrylate. Preferably, the acrylic polymer of the acrylic polymer waterborne dispersion is formed with non-ionic monomers selected from the group consisting of methyl methacrylate and 2-ethylhexyl acrylate.

For the various embodiments, the acrylic polymer in the acrylic polymer waterborne dispersion has a glass transition temperature (Tg) of 1° C. to 60° C. Preferably, the acrylic polymer in the acrylic polymer waterborne dispersion has a Tg of 5° C. to 55° C. More preferably, the acrylic polymer in the acrylic polymer waterborne dispersion has a Tg of 10° C. to 50° C. The Tg values of the acrylic polymer can be calculated by using the Fox equation (T. G. Fox, Bull. Am. Physics Soc., Volume 1, Issue No. 3, page 123 (1956)), where calculating the Tg of a copolymer of monomers M1 and M2 is determined using the equation:

$$1/Tg(calc) = w(M1)/Tg(M1) + w(M2)/Tg(M2)$$

wherein Tg(calc) is the glass transition temperature calculated for the copolymer; w(M1) is the weight fraction of monomer M1 in the copolymer; w(M2) is the weight fraction of monomer M2 in the copolymer; Tg(M1) is the glass transition temperature of the homopolymer of M1; Tg(M2) is the glass transition temperature of the homopolymer of M2, all temperatures being in degree Kelvin. The glass transition temperature of homopolymers may be found, for example, in "Polymer Handbook", edited by J. Brandrup and E. H. Immergut, Interscience Publishers. In calculating Tgs herein the contribution of copolymerized graftlinking monomers is excluded. The calculated Tg is calculated from the total overall composition of the acrylic polymer particle.

The acrylic polymer is substantially uncross-linked, that is the acrylic polymer includes less than 1 weight %, preferably less than 0.2 weight %, based on the weight of the polymer, and more preferably 0% of a copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The acrylic polymer waterborne dispersion for the various embodiments can also have an acid level of up to 2 percent by weight of acid monomers based on a dry weight of the acrylic polymer. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers are carboxylic acid monomers. More preferred monomers are (meth)acrylic acid. The acid level can be calculated by determining the number of milliequivalents of acid per gram in the acrylic polymer and multiplying by the molecular weight of potassium hydroxide.

The polymerization techniques used to prepare the acrylic polymer of the acrylic polymer waterborne dispersion include emulsion polymerization, which is well known in the art (e.g., examples disclosed in U.S. Pat. Nos. 4,325,856; 4,654,397; and 4,814,373 among others). Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used can be from 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfate may be used at similar levels, optionally in combination with metal ions such as, for example iron and copper, optionally further including complexing agents for the metal. The monomer mixture for a stage may be added neat or as an emulsion in water. The monomer mixture for a stage may be added in a single addition or more additions or continuously over the reaction period allotted for that stage using a uniform or varying composition; preferred is the addition of the polymer monomer(s) emulsion as a single addition. Additional ingredients such as, for example, free radical initiators, oxidants, reducing agents, chain transfer agents, neutralizers, surfactants, and dispersants may be added prior to, during, or subsequent to any of the stages.

The average particle diameter of the acrylic polymer particles can be from 40 to 1000 nanometers (measured with a Brookhaven Instruments particle size analyzer). The solids content of the acrylic polymer waterborne dispersion of the present disclosure may be from 30% to 70% by weight based on the total weight of the acrylic polymer waterborne dispersion. The viscosity of the acrylic polymer waterborne dispersion of the present disclosure may be from 10 centipoises to 9000 centipoises, as measured using a Brookfield viscometer; viscosities appropriate for different application methods vary considerably. The acrylic polymer waterborne dispersion of the present disclosure can have a pH of 3 to 11 as measured at 23° C.

Representative, non-limiting examples of commercially produced acrylic polymer waterborne dispersions useful for the binder of the present disclosure include those sold under the tradenames PRIMAL™ SS-640, PRIMAL™ AC-339, PRIMAL™ E-822K, UCAR™ Latex DL 420 G, PRIMAL™ AC-337 ER, PRIMAL™ CM-330, PRIMAL™ AC-285 and PRIMAL™ CM-160 (all available from DOW, Inc.).

Alkoxy Silane Coalescing Agent

The waterborne silane coalescing emulsion refer to a mixture of two immiscible liquids in which the alkoxy silane coalescing agent is dispersed in the aqueous based continuous phase. For the various embodiments, the alkoxy silane coalescing agent is selected from the group consisting of $R^1Si(OR)_3$, $(R^1)_2Si(OR)_2$ and combinations thereof, where each $R^1$ is independently selected from an alkyl group having 1 to 20 carbon atoms, a substituted alkyl group having 1 to 20 carbon atoms, an aryl group having 6 to 20 carbon atoms or a substituted aryl group having 6 to 20 carbon atoms, and where each R is independently selected from an alkyl group having 1 to 6 carbon atoms. More specifically, for the various embodiments the alkoxy silane coalescing agent is $R^1Si(OR)_3$. When the alkoxy silane coalescing agent is $R^1Si(OR)_3$, for the various embodiments, $R^1$ has 8 carbon atoms and R has 2 carbon atoms to provide triethoxy(octyl)silane. Alternatively, $R^1$ has 6 carbon atoms and R has 2 carbon atoms to provide triethoxy(hexyl)silane.

The term "substituted" as used in relation to another group, for example, an alkyl group, means, unless indicated otherwise, one or more hydrogen atoms in the alkyl group has been replaced with another substituent. Examples of such substituents include, an alkyl group having 1 to 6 carbon atoms, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

Forming the waterborne silane coalescing emulsion of the present disclosure can include forming a mixture by combining the desired ratio of the alkoxy silane coalescing agent to water or an aqueous based solution and mixing and homogenizing to form the waterborne silane coalescing emulsion of the present disclosure. Water, as used herein, can include deionized water, whereas an aqueous based solution can include water and one or more hydrophilic additives. Such hydrophilic additives include, but are not limited to, low molecular weight alcohols such as methanol, ethanol, propanol, isopropanol and the like. One or more of a foam control agent and/or a pH control agent can be included with the waterborne silane coalescing emulsion as desired.

Mixing so as to form the waterborne silane coalescing emulsion can be accomplished by known methods and may occur either as a batch, a semi-continuous, or a continuous process. Forming the waterborne silane coalescing emulsion of the present disclosure can include adding from 30 to 900 parts of water or the aqueous based solution for every 100 parts of the alkoxy silane coalescing agent. This allows for the waterborne silane coalescing emulsion to have a "solids"

content) of 5% to 80% by volume. The average volume particle size of the alkoxy silane coalescing agent can be from 0.1 to 5 μm. The viscosity of the waterborne silane coalescing emulsion of the present disclosure as measured using a Brookfield viscometer; viscosities appropriate for different application methods vary considerably, depending on the actual solid content.

The process of combining and mixing the components for the waterborne silane coalescing emulsion may occur in a single step or multiple step process. Thus, the components may be combined in total, and subsequently mixed via any of the techniques described herein. Alternatively, a portion (s) of the components may first be combined, mixed, and followed by combining additional quantities of the components and further mixing. One skilled in the art would be able to select optimal portions of the components for combing and mixing, depending on the selection of the quantity used and the specific mixing techniques utilized in forming the waterborne silane coalescing emulsion.

Representative, non-limiting examples of commercially produced waterborne silane coalescing emulsions useful for the binder of the present disclosure include those sold under the tradenames DOWSIL™ IE-6692 (DOW, Inc.).

The aqueous coating composition can be prepared by techniques that are well known in the coatings art. The acrylic polymer waterborne dispersion and the waterborne silane coalescing emulsion can be added under low shear stirring along with the optional additives and coatings adjuvants as desired. The aqueous coating composition may contain, in addition to the acrylic polymer waterborne dispersion and the waterborne silane coalescing emulsion optional additives. Examples of such additives include, but are not limited to, inorganic fillers such as calcium carbonate ($CaCO_3$), quartz, biocides when water is present, untreated and treated silicas, metal hydroxide micropowders such as aluminum hydroxide micropowder, calcium hydroxide micropowder, and magnesium hydroxide micropowder, bisamides, flake-form fillers such as mica, dimethylpolysiloxanes, epoxy-functional diorganopolysiloxanes, and amino-functional diorganopolysiloxanes. The additives can further include pigments, as are known in the art. Additional additives also include curing agents, buffers, corrosion inhibitors, neutralizers, humectants, wetting agents, antifoaming agents, UV absorbers, fluorescent brighteners, light or heat stabilizers, biocides, dispersants, colorants, colorant dispersions, waxes, water-repellants, pigments, extenders, anti-oxidants and dyes can be added to the coating composition. Additional components that may also be included in the coating composition may be preservatives, freeze/thaw additives, and various thickeners.

The aqueous coating composition of the present disclosure can be used to help control efflorescence in porous construction materials. For the various embodiments, the aqueous coating composition as provided herein can have water in an amount sufficient to provide the aqueous coating composition with a solids content of 2 to 70 wt. % based on the total weight of the aqueous coating composition. Mixing to form the aqueous coating composition with a solids content of 2 to 70 wt. % based on the total weight of the aqueous coating composition can be accomplished by known methods and may occur either as a batch, a semi-continuous, or a continuous process. Forming the aqueous coating composition of the present disclosure can include water or an aqueous coating composition to the coating composition, as provided herein, to arrive at the solids content of 2 to 70 wt. % based on the total weight of the aqueous coating composition. As appreciated, arriving at the solids content for the aqueous coating composition will depend on the solids content of each of the acrylic polymer waterborne dispersion and the waterborne silane coalescing emulsion.

The process of combining and mixing the acrylic polymer waterborne dispersion and the waterborne silane coalescing emulsion may occur in a single step or multiple step process. Thus, the components may be combined in total, and subsequently mixed via any of the techniques described herein. Alternatively, a portion(s) of the components may first be combined, mixed, and followed by combining additional quantities of the components and further mixing. One skilled in the art would be able to select optimal portions of the components for combing and mixing, depending on the selection of the quantity used and the specific mixing techniques utilized in forming the aqueous coating composition.

As discussed herein, embodiments of the aqueous coating composition can be used for controlling efflorescence in porous construction materials. The aqueous coating composition of the present disclosure can be used to form a film on a porous construction material. Specifically, the present disclosure includes a porous construction material at least partially coated with a film formed with the aqueous coating composition as provided herein. For example, the aqueous coating composition of the present disclosure can be used to at least partially coat the subsequently form a film the porous construction material. Examples of porous construction material can include an inorganic porous construction material, where the inorganic porous construction material can be a cement based porous construction material. Other examples of inorganic porous construction materials include, but are not limited to, brick, clay, fiber cement, concrete, gypsum, stucco, drywall and mortar that are either new and not previously painted or treated, previously printed, painted or primed surfaces, or weathered surfaces. Additional examples of porous construction material can include organic porous construction material, where the organic porous construction material can be a cellulose-based construction material. Other examples of organic porous construction materials include, but are not limited to wood, oriented strand board (OSB), particle board, chip board and medium-density fiberboard (MDF).

In providing a film formed with the aqueous coating composition of the present disclosure the aqueous coating composition of the present disclosure is applied to the porous construction material and, dried, or allowed to dry. The aqueous coating composition is typically applied to a porous construction material using conventional coatings application methods such as, for example, paint brush, paint roller, gravure roll, curtain coater and spraying methods such as, for example, air-atomized spray, air-assisted spray, airless spray, high volume low pressure spray, and air-assisted airless spray. Drying of the aqueous coating composition may proceed under ambient conditions such as, for example, at 5° C. to 35° C. or the coating may be dried at elevated temperatures such as, for example, from 35° C. to 100° C.

The following examples serve to illustrate the disclosure.

EXAMPLES

In the Examples, various terms and designations for materials were used including, for example, the following:

TABLE 1

List of materials

| Material | Description/Source | Tg (° C.) |
|---|---|---|
| Butyl CELLOSOLVE ™ | Ethylene Glycol Monobutyl Ether, DOW, Inc. | — |
| DOWSIL ™ IE-6692 Emulsion | A 52% active non-ionic emulsion containing alkoxysilanes as provided herein, DOW, Inc. | — |
| PRIMAL ™ E-357 EF | Acrylic polymer waterborne dispersion | 54 |
| PRIMAL ™ SS-640 | Acrylic polymer waterborne dispersion, DOW, Inc. | 29 |
| PRIMAL ™ AC-339 | Acrylic polymer waterborne dispersion, DOW, Inc. | 26 |
| PRIMAL ™ E-822K | Acrylic polymer waterborne dispersion, DOW, Inc. | 25 |
| UCAR ™ Latex DL 420 G | Acrylic polymer waterborne dispersion, DOW, Inc. | 24 |
| PRIMAL ™ AC-337 ER | Acrylic polymer waterborne dispersion, DOW, Inc. | 22 |
| PRIMAL ™ CM-330 | Acrylic polymer waterborne dispersion, DOW, Inc. | 20 |
| PRIMAL ™ AC-285 | Acrylic polymer waterborne dispersion, DOW, Inc. | 16 |
| PRIMAL ™ CM-160 | Acrylic polymer waterborne dispersion, DOW, Inc. | 8 |

Minimum Film Formation Temperature (MFFT)

The minimum film formation temperature (MFFT) of an aqueous coating composition is the lowest temperature at which the aqueous coating composition forms a practical film. MFFT is measured using ASTM standard D2354-10. For this test method, the MFFT is determined as the lowest temperature over the controlled temperature gradient where the film became optically clear and attained mechanical integrity. In addition to the visual MFFT, a mechanical MFFT is also be determined by locating the minimum temperature at which the aqueous coating composition formed a film with some mechanical strength.

To determine the coalescent efficiency, that is, the ability to lower MFFT of different molecules, measure the MFFT at various coalescing agent levels. Tables 2A and 2B show the visual MFFT of various acrylic polymer waterborne dispersion binders with either an alkoxy silane coalescing agent (Dowsil™ IE-6692) or Butyl CELLOSOLVE™ solvent at various levels. The weight percent coalescent level is based on the dry weight of the acrylic polymer in the acrylic polymer waterborne dispersion.

For a molecule to behave as an effective coalescent, it must lower the glass transition temperature (Tg) of the acrylic polymer in the waterborne dispersion binder it is blended with. The coalescent agent must also be compatible with the acrylic polymer waterborne dispersion of interest and have a lower Tg than the acrylic polymer waterborne dispersion binder itself. For a given type of molecule, compatibility (or solubility) will generally decrease with increasing molecular weight due to entropic effects.

Tables 2A and 2B provide visual MFFT Data for Examples (EX) 1 through 14 having the coalescing agent Dowsil™ IE-6692 at either 6 wt % or 12 wt % of active coalescent per dry binder content and Comparative Examples (CEx) A through Q for either no coalescing agent or for the use of Butyl CELLOSOLVE™ at 6 wt. % or a 12 wt. % level coalescent per dry binder content. Tables 2A and 2B demonstrate that there is a MFFT decreases for each formulation with increasing Dowsil™ IE-6692 level concentrations. At both the 6 wt. % and 12 wt. % levels, the MFFT the aqueous coating compositions of the present disclosure showed a decrease in MFFT values in comparison to the absence of any coalescing agent but also values closer to the ones employing the reference coalescing agent Butyl CELLOSOLVE™ Solvent.

TABLE 2A

Minimum Film Forming Temperature (MFFT) of Aqueous Coating Compositions

| Coalescing Agent (wt. % per dry binder) | Minimum film forming temperature (° C.) (Example, EX; Comparative Example, CEx) | | | | |
|---|---|---|---|---|---|
| | PRIMAL ™ E-357 EF | PRIMAL ™ SS-640 | PRIMAL ™ AC-339 | PRIMAL ™ E-822K | UCAR ™ Latex DL 420 G |
| None | 55° C. (CEx A) | 28° C. (CEx B) | 28° C. (CEx C) | 18° C. (CEx C) | 20° C. (CEx D) |
| Butyl CELLOSOLVE ™ Solvent [6 wt. %] | 36° C. (CEx E) | 15° C. (CEx F) | 15° C. (CEx G) | 6° C. (CEx H) | 15° C. (CEx I) |
| Dowsil ™ IE-6692 [6 wt. %] | 38° C. (EX 1) | 20° C. (EX 2) | 20° C. (EX 3) | 10° C. (EX 4) | 15° C. (EX 5) |
| Dowsil ™ IE-6692 [12 wt. %] | 33° C. (EX 6) | 16° C. (EX 7) | 19° C. (EX 8) | 9° C. (EX 9) | 14° C. (EX 10) |

TABLE 2B

MFFT of Aqueous Coating Compositions

| Coalescing Agent (wt. % per dry binder) | Minimum film forming temperature (° C.) (Example, EX; Comparative Example, CEx) | | | |
|---|---|---|---|---|
| | PRIMAL ™ AC-337 ER | PRIMAL ™ CM-330 | PRIMAL ™ AC-285 | PRIMAL ™ CM-160 |
| None | 14° C. (CEx J) | 10° C. (CEx K) | 5° C. (CEx L) | 1° C. (CEx M) |

TABLE 2B-continued

MFFT of Aqueous Coating Compositions

| Coalescing Agent (wt. % per dry binder) | Minimum film forming temperature (° C.) (Example, EX; Comparative Example, CEx) | | | |
|---|---|---|---|---|
| | PRIMAL ™ AC-337 ER | PRIMAL ™ CM-330 | PRIMAL ™ AC-285 | PRIMAL ™ CM-160 |
| Butyl CELLOSOLVE ™ Solvent [6 wt %] | 0.8° C. (CEx N) | −0.2° C. (CEx O) | −1.8° C. (CEx P) | 0.1° C. (CEx Q) |
| Dowsil ™ IE-6692 [6 wt %] | 2.2° C. (EX 11) | 0.3° C. (EX 12) | −0.8° C. (EX 13) | 0.5° C. (EX 14) |

Film Formation Kinetics

Using a Horus® Rheolaser coating equipment (Formulaction), measure the film formation speckle rate kinetics of the aqueous coating compositions, where the method is based on multi-speckle diffusive wave spectroscopy. Briefly, in this test monitoring the film formation speckle rate kinetics is done by measuring the rate of speckle image fluctuations during the drying process of a film applied on uncoated glass substrate and it is related to the motion speed of scatters in the sample. A laser illuminates the surface of the drying film and light scatters due to microstructural changes. A detector captures the backscatter light and forms a speckle image, by comparison of different speckle images and the intensity which the changes are occurring, a graph is generated and can help to identify drying mechanisms and characteristic drying times. Fast structural changes during the drying process of a film, due to events such as solvent evaporation and particles diffusion, result in high speckle rate. As the motion of scatters slows down due to packing and interdiffusion of particles forming a coherent film, the speckle rate decreases and becomes constant with time.

Prepare the aqueous coating compositions using a ratio of the acrylic polymer to the coalescing agent (wt:wt based on total wt. of aqueous coating composition) of 90:10 to 95:5. Use an acrylic to Butyl CELLOSOLVE™ Solvent ratio of 95:05 as a reference coalescing agent. Apply a 60 µm thickness wet drawdown coating of a selected formulation using a gap coating applicator on uncoated glass substrate using an automatic control coater (K Control Coater, RK Printcoat instruments) operating at the speed of 4 m/min. Immediately after, measure the film formation kinetics using the Horus® Rheolaser coating equipment (Formulaction) as described above.

Referring now to FIGS. 1A-1H, it is seen that the aqueous coating compositions formed with Dowsil™ IE-6692 exhibited a similar speckle rate kinetics behavior in comparison to the ones with Butyl CELLOSOLVE™ Solvent for the same acrylic binder composition albeit with a slower drying progression. Dowsil™ IE-6692 act with a mechanism similar to the reference coalescing agent (Butyl CELLOSOLVE™ Solvent) in the film formation process of acrylic latexes. One advantage of the slower drying progression for the aqueous coating compositions Examples formed with Dowsil™ IE-6692 is the additional time for film formation may allow for more silane groups to migrate to the surface of the film.

Water Uptake Testing

Figures 2A, 2B:
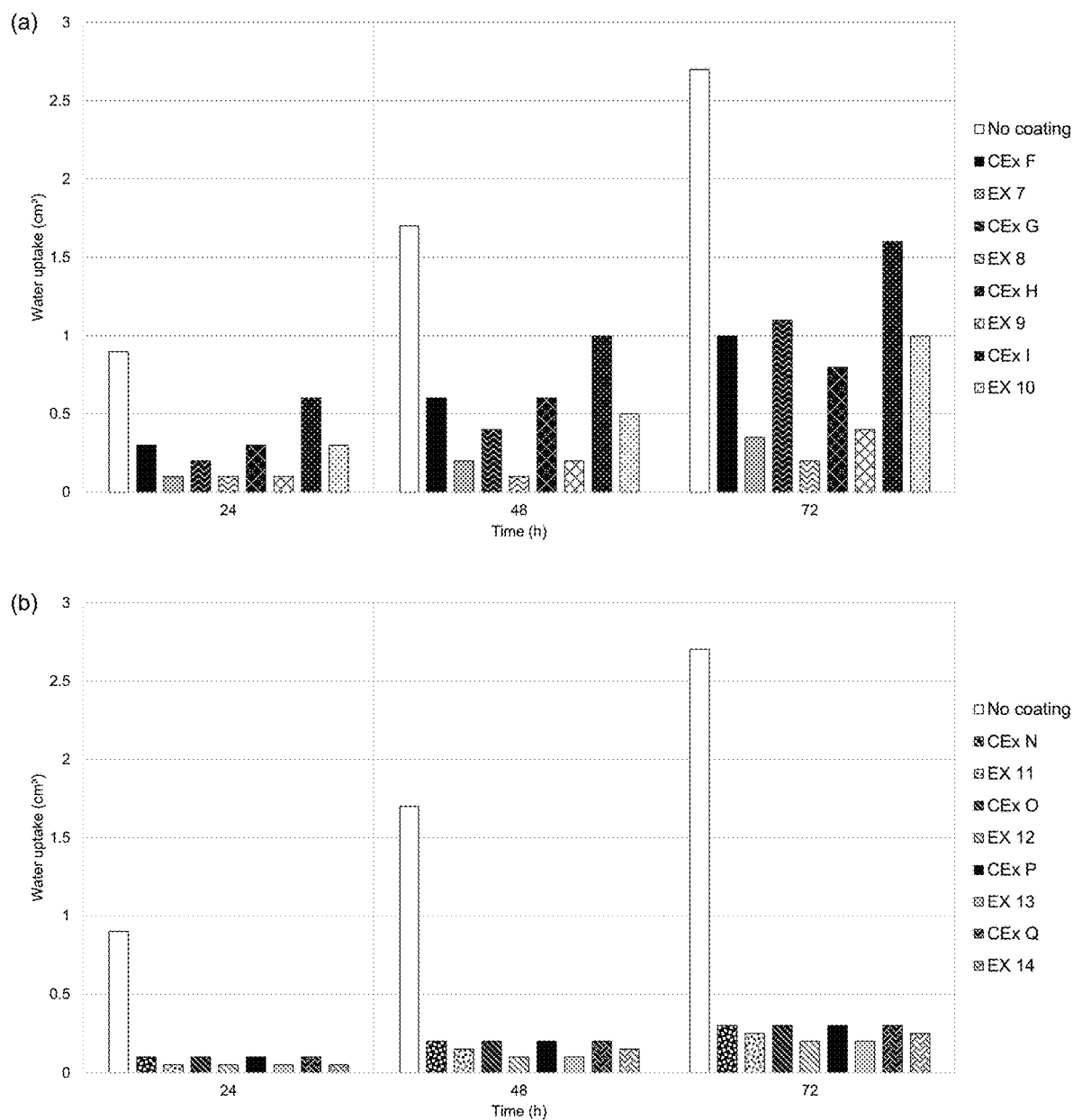
FIGS. 2A-2B illustrate water uptake as function of contact time with substrate coated with aqueous coating compositions of the Comparative Examples and Examples of the present disclosure.

Evaluate the water protection performance of films formed on fiber cement board using the different aqueous coating compositions using the RILEM (Reunion Internationale des Laboratoires d'Essais et de Recherchessur les Materiaux et les Constructions) Test 11.4 (horizontal version), which is designed to measure the quantity of water absorbed by the surface (5 cm$^2$ exposed surface) of a masonry material over a defined period of time. In this test, the rate at which water moves through the fiber cement material is measured and can be used to assess the degree of protection provided by the water repellent treatment. The water absorption in milliliters or cubic centimeters (cm$^3$) of each fiber cement board sample after various times is seen in FIGS. 2A and 2B. An untreated fiber cement board was used as a reference. The values in FIGS. 2A and 2B are in cm$^3$ of water absorbed.

Prepare the aqueous coating compositions using a ratio of the acrylic polymer to the coalescing agent (wt:wt based on total wt. of aqueous coating composition) of 90:10 to 95:5. Use an acrylic to Butyl CELLOSOLVE™ Solvent ratio of 95:05 as a reference coalescing agent. Apply a 200 g/m$^2$ of the aqueous coating composition on the surface of uncoated fiber cement panels as substrate and kept at room temperature (23° C.) to dry. After that, fix a RILEM test tube on the top of the dried coated substrate and add deionized water through the upper open end of the test tube until the zero (0) gradation mark. The samples were kept at room temperature (23° C.) and at specific intervals record the amount of water absorbed by the fiber cement board sample. An uncoated fiber cement panel was used as a reference.

FIGS. 2A and 2B shows that excellent water exclusion is obtained using the alkoxy silane coalescing agent according to the present disclosure even for extended (prolonged) periods of time. It can be clearly seen that the volume of water uptake was lower on all panels treated with formulation blends using Dowsil™ IE-6692 in comparison to the samples using Butyl CELLOSOLVE™ Solvent for the same acrylic binders after each time interval tested. These results indicate that the presence of Dowsil™ IE-6692 in the aqueous coating compositions contributed to a better performance on fiber cement surface protection against water than the use of the standard coalescing agent.

What is claimed:

1. An aqueous coating composition for porous construction materials, comprising:
    3.5 to 95 weight percent (wt. %) of a binder, the binder comprising by dry weight based on the total dry weight of the binder:
        90 wt. % to 97 wt. % of an acrylic polymer in an acrylic polymer waterborne dispersion, wherein the acrylic polymer has a glass transition temperature (Tg) of 1° C. to 60° C.; and
        10 wt. % to 3 wt. % of an alkoxy silane coalescing agent in a waterborne silane coalescing emulsion; and 96.5 to 5 wt. % of an additive selected from the group consisting of a pigment, a filler and combinations thereof, the wt. % of the binder and the additive are based on the total dry weight of the aqueous coating composition.

2. The aqueous coating composition of claim 1, wherein the alkoxy silane coalescing agent provides the only coalescing agent for the acrylic polymer waterborne dispersion in the aqueous coating composition.

3. The aqueous coating composition of claim 1, wherein the acrylic polymer in the acrylic polymer waterborne dispersion has a Tg of 25° C. to 55° C.

4. The aqueous coating composition of claim 1, wherein the alkoxy silane coalescing agent is selected from the group consisting of $R^1Si(OR)_3$, $(R^1)_2Si(OR)_2$ and combinations thereof, wherein each $R^1$ is independently selected from an alkyl group having 1 to 20 carbon atoms, a substituted alkyl group having 1 to 20 carbon atoms, an aryl group having 6 to 20 carbon atoms or a substituted aryl group having 6 to 20 carbon atoms, and wherein each R is independently selected from an alkyl group having 1 to 6 carbon atoms.

5. The aqueous coating composition of claim 4, wherein the alkoxy silane coalescing agent is $R^1Si(OR)_3$.

6. The aqueous coating composition of claim 5, wherein $R^1$ has 8 carbon atoms and R has 2 carbon atoms to provide triethoxy(octyl)silane; or
wherein $R^1$ has 6 carbon atoms and R has 2 carbon atoms to provide triethoxy(hexyl)silane.

7. The aqueous coating composition of claim 1, wherein the acrylic polymer waterborne dispersion has an acid level of up to 2 percent by weight of acid monomers based on a dry weight of the acrylic polymer.

8. The aqueous coating composition of claim 1, wherein the acrylic polymer of the acrylic polymer waterborne dispersion is formed with non-ionic monomers selected from the group consisting of methyl methacrylate, methyl acrylate, ethyl acrylate, butyl acrylate, styrene, butyl methacrylate, 2-ethylhexyl acrylate, t-butyl acrylate, α-methyl styrene, vinyl acetate, hexyl acrylate and combinations thereof.

9. The aqueous coating composition of claim 1 having water in an amount sufficient to provide the aqueous coating composition with a solids content of 2 to 70 wt. % based on the total weight of the aqueous coating composition.

10. A porous construction material at least partially coated with a film formed with the aqueous coating composition of claim 1.

11. The porous construction material of claim 10, wherein the porous construction material is an inorganic porous construction material.

12. The porous construction material of claim 10, wherein the porous construction material is an organic porous construction material.

13. An aqueous coating composition for porous construction materials, comprising:
100 weight percent (wt. %) of a binder, the binder comprising by dry weight based on the total dry weight of the binder:
85 wt. % to 97 wt. % of an acrylic polymer in an acrylic polymer waterborne dispersion, wherein the acrylic polymer has a glass transition temperature (Tg) of 1° C. to 60° C.; and
15 wt. % to 3 wt. % of an alkoxy silane coalescing agent in a waterborne silane coalescing emulsion.

14. The aqueous coating composition of claim 13 wherein the alkoxy silane coalescing agent provides the only coalescing agent for the acrylic polymer waterborne dispersion in the aqueous coating composition.

15. The aqueous coating composition of claim 13, wherein the acrylic polymer in the acrylic polymer waterborne dispersion has a Tg of 25° C. to 55° C.

16. The aqueous coating composition of claim 13, wherein the alkoxy silane coalescing agent is selected from the group consisting of $R^1Si(OR)_3$, $(R^1)_2Si(OR)_2$ and combinations thereof, wherein each $R^1$ is independently selected from an alkyl group having 1 to 20 carbon atoms, a substituted alkyl group having 1 to 20 carbon atoms, an aryl group having 6 to 20 carbon atoms or a substituted aryl group having 6 to 20 carbon atoms, and wherein each R is independently selected from an alkyl group having 1 to 6 carbon atoms.

17. The aqueous coating composition of claim 13, wherein the acrylic polymer waterborne dispersion has an acid level of up to 2 percent by weight of acid monomers based on a dry weight of the acrylic polymer.

18. The aqueous coating composition of claim 13, wherein the acrylic polymer of the acrylic polymer waterborne dispersion is formed with non-ionic monomers selected from the group consisting of methyl methacrylate, methyl acrylate, ethyl acrylate, butyl acrylate, styrene, butyl methacrylate, 2-ethylhexyl acrylate, t-butyl acrylate, α-methyl styrene, vinyl acetate, hexyl acrylate and combinations thereof.

19. The aqueous coating composition of claim 13 having water in an amount sufficient to provide the aqueous coating composition with a solids content of 2 to 70 wt. % based on the total weight of the aqueous coating composition.

20. A porous construction material at least partially coated with a film formed with the aqueous coating composition of claim 13.

* * * * *